United States Patent
Fessler et al.

(10) Patent No.: US 9,175,956 B2
(45) Date of Patent: Nov. 3, 2015

(54) CONSTRUCTION LASER SYSTEM HAVING A ROTATION LASER AND A LASER RECEIVER, WITH FUNCTIONALITY FOR AUTOMATIC DETERMINATION OF THE LASER RECEIVER DIRECTION

(71) Applicant: LEICA GEOSYSTEMS AG, Heerbrugg (CH)

(72) Inventors: Thilo Fessler, Hard (AT); Bernd Stöckel, Rebstein (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 84 days.

(21) Appl. No.: 14/218,700

(22) Filed: Mar. 18, 2014

(65) Prior Publication Data

US 2014/0283397 A1   Sep. 25, 2014

(30) Foreign Application Priority Data

Mar. 19, 2013   (EP) .................................... 13160068

(51) Int. Cl.
*G01B 11/26* (2006.01)
*G01C 15/00* (2006.01)
(Continued)

(52) U.S. Cl.
CPC ............... *G01B 11/26* (2013.01); *G01B 11/00* (2013.01); *G01C 9/06* (2013.01); *G01C 15/004* (2013.01); *G01C 2009/066* (2013.01)

(58) Field of Classification Search
CPC ...... G01B 11/26; G01C 15/004; G01C 9/006; G01C 2009/066

USPC .................................... 33/290, 291, 293, 294
See application file for complete search history.

(56) References Cited

U.S. PATENT DOCUMENTS

| 4,240,208 A | 12/1980 | Pehrson |
| 5,485,266 A | 1/1996 | Hirano et al. |
| 5,953,108 A | 9/1999 | Falb et al. |

(Continued)

FOREIGN PATENT DOCUMENTS

| EP | 1 174 682 A2 | 1/2002 |
| EP | 1 790 940 A2 | 5/2007 |

(Continued)

OTHER PUBLICATIONS

European Search Report dated Aug. 19, 2013 as received in Application No. EP 13 16 0068.

*Primary Examiner* — G Bradley Bennett
(74) *Attorney, Agent, or Firm* — Maschoff Brennan

(57) ABSTRACT

A construction laser system includes a rotation laser and a laser receiver. To determine a direction in which the laser receiver lies in sight of the rotation laser, a digital code respectively assigned uniquely to the respective rotation angle ranges includes a state value sequence based on a defined sequence of states relating to the laser beam. In the respective rotation angle ranges, the corresponding sequence of states is respectively generated by successively occurring crossings of the respective rotation angle range. On the receiver side, an output signal is generated as a function of incidence of the laser beam. With the aid of an output signal sequence of successively generated output signals, which is acquired by the evaluation unit, the state value sequence corresponding to the acquired output signal sequence is identified, permitting final determination of the corresponding rotation angle range in which the laser receiver lies.

20 Claims, 4 Drawing Sheets

(51) Int. Cl.
  *G01B 11/00* (2006.01)
  *G01C 9/06* (2006.01)

(56) References Cited

U.S. PATENT DOCUMENTS

| | | | |
|---|---|---|---|
| 6,055,046 A | 4/2000 | Cain | |
| 6,314,650 B1 | 11/2001 | Falb | |
| 6,693,706 B2 | 2/2004 | Kahle et al. | |
| 7,394,527 B2 | 7/2008 | Essling et al. | |
| 7,433,028 B2 | 10/2008 | Kumagai et al. | |
| 7,610,687 B2 | 11/2009 | Stegmaier | |
| 7,719,778 B2 | 5/2010 | Kodaira | |
| 8,132,334 B2 | 3/2012 | Winistoerfer | |
| 2004/0125356 A1 | 7/2004 | Connolly | |
| 2011/0235053 A1 | 9/2011 | Campagna | |
| 2012/0130675 A1* | 5/2012 | Schorr et al. | 702/154 |
| 2013/0298413 A1 | 11/2013 | Kehl et al. | |
| 2013/0326892 A1* | 12/2013 | Schorr | 33/228 |
| 2014/0047724 A1 | 2/2014 | Winistoerfer | |
| 2014/0190025 A1* | 7/2014 | Giger et al. | 33/228 |
| 2014/0304994 A1* | 10/2014 | Dumoulin | 33/228 |
| 2015/0092183 A1* | 4/2015 | Dumoulin et al. | 356/4.07 |
| 2015/0185008 A1* | 7/2015 | Nishita | 33/290 |

FOREIGN PATENT DOCUMENTS

| | | |
|---|---|---|
| EP | 1 901 034 A1 | 3/2008 |
| EP | 2 199 739 A1 | 6/2010 |
| EP | 2 327 958 A1 | 6/2011 |
| EP | 2 453 204 A1 | 5/2012 |
| EP | 2 522 954 A1 | 11/2012 |
| WO | 2006/070009 A2 | 7/2006 |

* cited by examiner

CONSTRUCTION LASER SYSTEM HAVING A ROTATION LASER AND A LASER RECEIVER, WITH FUNCTIONALITY FOR AUTOMATIC DETERMINATION OF THE LASER RECEIVER DIRECTION

FIELD OF THE INVENTION

The invention relates to a construction laser system for work in building and/or interior construction, consisting of a rotation laser and a laser receiver, with improved functionality regarding preparation outlay and operating speed, for determining a direction in which the laser receiver lies in sight of the rotation laser. The invention furthermore relates to a corresponding method with a rotation laser and laser receiver, determination of the direction in which the laser receiver lies in sight of the rotation laser being carried out in an improved manner, and to a computer program product for carrying out this method.

BACKGROUND

It is known to use rotation lasers on building sites, for example of buildings or in road building and/or earthworks. Particularly used are rotation lasers in which a laser beam (in the visible or infrared wavelength range) emitted by a laser unit generates a reference surface by deflection using a rotating deflection prism, this then providing a precise plane reference (in particular a height reference in the case of a horizontal plane).

Many of the currently existing rotation lasers in this context have a beam self-horizontalizing functionality (also known as self-leveling). Various technical solutions are known for fulfilling such a beam self-horizontalizing functionality, which, although they may be of purely mechanical nature, are nowadays nevertheless mostly based on sensors of an optical type. For example, the central component of the rotation laser (i.e. the laser core module), in particular comprising the laser unit and the rotatable deflection prism, may be suspended in a pendular fashion so that horizontalization accuracy can be achieved by employing gravity. The laser core module may, however, in this case advantageously be suspended precisely inclinably in a motorized fashion about two axes (at least slightly in a range of, for example, ±5° on an external housing of the device, and equipped with an inclination sensor or a horizontalization sensor, the display or signal of which can be read out and used as a starting value for active modification of the inclination position of the laser core module.

Depending on the level of development, known rotation sensors nowadays in this case also have a function (with a corresponding mechanism, sensors and control) for controlled desired inclination of the laser plane relative to the horizontal in one or two directions. To this end, the central component of the rotation laser, in particular comprising the laser unit and the rotatable deflection prism, may be inclined in a controlled motorized fashion about one axis or two axes and brought into desired inclination positions, so that the rotation axis and consequently also the spanned plane are thereby also inclined in the desired way. Corresponding mechanisms, sensors and controls for this are well known in the prior art and are described, for example, in the patent literature publications U.S. Pat. No. 5,485,266 A, US 2004/0125356 A1, EP 1 790 940 A2, EP 1 901 034 A2, EP 2 327 958 A1 and EP 2 522 954 A1.

If the rotating laser beam emitted by the rotation laser is in this case emitted in the visible spectrum and it strikes a surface, for example, a wall, a floor or a ceiling of a building, a reference line as a basis of further measures is visible there.

For precise transmission of the reference plane or reference height defined by the rotating laser beam, for example onto a wall or into terrain, handheld laser receivers are known which can highly accurately determine and indicate a position relative to a reference surface spanned by the rotation laser.

Handheld laser receivers known from the prior art for the determination of a position relative to the reference surface may in this case have a laser beam detector comprising a multiplicity of photosensitive elements, which is formed in order to generate an output signal when the laser beam strikes the laser beam detector. In detail, the laser beam detector is usually configured in this case so that an incidence position of the laser beam on the laser beam detector surface can additionally be derived, to which end the photosensitive elements—as considered in an upright operating position of the device—may be sequenced with one another in a vertically oriented sensor row, so that the laser beam detector thus extends at least over a one-dimensional region on the laser receiver. Furthermore, an evaluation unit for determining the position of the laser receiver relative to the reference height defined by the rotating laser beam with the aid of the output of the laser beam detector, as well as an indicator for the position determined (for instance a visual display), in particular formed in order to indicate whether the laser receiver coincides exactly with the reference surface, are usually integrated into the laser receiver device. The position may, for example, in this case be determined with the aid of a ratio of a plurality of output signals (for example as the midpoint of that subregion on the laser beam detector row which is illuminated by the laser beam).

Handheld laser receivers of this kind may, in particular, be used when the line imaged by the rotating laser beam is visible to the eye only with difficulty or not precisely enough. This is the case, for example, in the event of sizeable distances from the rotation laser (for example due to divergence of the laser beam [→ the imaged line becomes too wide] or a low light power (which is subject to certain limits for eye safety reasons) [→ the imaged line becomes too weakly visible] and/or high ambient brightness) or when using laser light in the nonvisible wavelength range.

In such cases, with the aid of such laser receivers it now becomes possible to find the laser beam and indicate or read the laser plane (or reference height) defined by a rotating laser beam, and to transmit the height information into the terrain or onto a wall (etc.). For example, a corresponding marking—indicated by the laser receiver—may be applied at the reference height.

To this end, on the user side, the laser receiver is for example moved up and down in a search pattern in the vertical direction and finally brought into the position in which the indicator displays coincidence with the reference surface. As the indicator, for example, a visual display may be provided which gives information (for example by luminous arrows or different-colored LEDs) about whether a defined zero point of the laser receiver (for example a surface midpoint of the detector surface):
  lies exactly at the height of the reference surface,
  lies above the reference surface or
  lies below the reference surface.

Examples of such laser receivers are disclosed in documents EP 2 199 739 A1 and U.S. Pat. No. 4,240,208.

In order to provide the user with simple transmission of the reference height determined and indicated by the laser receiver, a height mark may be provided on the housing of the laser receiver at the height of the defined zero point (for example a notch or a printed line laterally on the housing).

U.S. Pat. No. 7,394,527 discloses a system consisting of a laser emitter and a laser receiver, the intention being to determine a distance of the laser receiver from the laser emitter. To this end, it is proposed to emit two mutually parallel laser beams in a rotating fashion and to determine the distance as a function of the rotation speed and time offset of the laser pulses of the two laser beams, which are received directly after one another. In a similar way to this—when there are a plurality of detector strips offset parallel to one another on the receiver (with an accurately known parallel offset of the detector strips from one another)—as an alternative, a single laser beam may also be emitted in a rotating fashion, in which case the distance from the receiver to the laser emitter is determined as a function of the time offset of the laser pulses received successively by the respective detector strips.

U.S. Pat. No. 5,953,108 discloses a system consisting of a rotation laser and a laser receiver, the laser beam rotating with a first speed when no information is being transmitted to the laser receiver, and with a second speed different to the first rotation speed so as thereby to transmit predefined information concerning a status of the rotation laser (for example "low battery").

For a range of known functions and applications of a system consisting of a rotation laser (in particular a dual-grade rotation laser) and a laser receiver, knowledge (sometimes approximate) about a laser receiver direction may additionally be necessary or at least helpful, that is to say knowledge about a direction in which the laser receiver lies in sight of the rotation laser (for example with respect to a coordinate system internal to the rotation laser).

Examples of such functions and applications may in this case be:

a) Grade catch (also known as plane or slope catch), for example when the receiver is lost from the locked-in state (see b)):

A search of the receiver is carried out by varying inclination of the reference plane spanned by the rotating laser beam and finding as a function of a hit signal emitted from the receiver to the rotator.

Contact Point of the Function with Laser Receiver Direction:

If an azimuthal direction to the receiver is known (for example from a previous locked-in state), then the search process can be accelerated with the aid of this laser receiver direction (less uncertainties existing for the conduct of the search process). If it is furthermore known whether the laser receiver has left the plane from the locked-in state upward or downward, then—in turn with the aid of the laser receiver direction—the search process can again be carried out more expediently.

b) Grade lock (also known as plane lock or slope lock, optionally with tracking), which can only be carried out when the reference plane has already (at least somewhat) impinged on the detector region of the receiver, i.e. in particular directly following a grade catch (that is to say after "finding" the receiver):

The reference plane is locked in at the zero point of the receiver (that is to say controlled inclination of the reference plane so that it intersects the zero point of the receiver) and this state is optionally continuously held (for example, even if the receiver moves, which is then known as tracking), it being ensured continuously by controlled readjustment of the reference plane inclination that the zero point of the receiver is touched by the reference plane, or cuts the reference plane).

Contact Point of the Function with Laser Receiver Direction:

In the event of dynamic movement of the receiver, the tracking (that is to say the following of the reference plane by controlled inclination thereof) can only be carried out sufficiently rapidly with direct knowledge of which deviation, measured on the receiver side, between the current reference plane incidence point and the zero point of the laser receiver, needs to be reacted to with which inclination adjustment. To this end, knowledge about the laser receiver direction can be very helpful for stabilizing this tracking process and making it more direct, and therefore permitting faster and more dynamic tracking.

c) Axis alignment/axis finding:

Fictitious x' and y' axes (that is to say fictitious axes which do not correspond with the orientation, dictated by setup and design, of the actual x inclination and y inclination axes of the core module), about which the laser plane is intended to be inclined as input by the user, may be defined on the user side. This user-side input of the desired orientation of the fictitious x' and y' axes may be carried out with the aid of a current direction to the receiver, which is to be determined (so that, for example, the fictitious x' axis can be placed in this azimuthal direction to the receiver).

Furthermore, for the purpose of the axis alignment, an assistance functionality may also be implemented in such a way that signaling in relation to the quality of the orientation of the inclination axis is carried out, for instance by a display which assists the orientation of the laser core module, effected on the user side (for example a value indication or left/right/middle information). This is advantageous in particular when, owing to design, the inclination system does not permit provision of fictitious x' and y' axes, as for instance in rotation laser systems of low development levels with exclusive horizontalization function (self leveling), which do not have means for mechanical rotation of the inclination axis/axes.

Contact Point of this Function with Laser Receiver Direction:

For this function (at least when defining the fictitious x' and y' axes by means of a current direction to the receiver), knowledge about the laser receiver direction is necessary.

Special aspects and embodiments relating to these functions are described, for example, in the patent literature publications U.S. Pat. No. 6,055,046 A, U.S. Pat. No. 6,314,650 B1 and U.S. Pat. No. 6,693,706 B2.

Inter alia, the following methods are in this case known in the prior art (inter alia from the publications mentioned in the section immediately above) for the determination of a laser receiver direction in a system consisting of a rotation laser and a laser receiver:

1) Evaluation of a signal generated directly (in real time) after detection of a beam on the receiver side, this signal being transmitted from the receiver to the rotator (for example by radio), and derivation of an emission angle which the rotating laser beam was probably at the time of incidence.

2) Defined inclination of the reference plane by a known inclination angle and reading, on the laser receiver side, of a thereby caused height offset of the beam strike on the detector of the laser receiver (with these steps being carried out for both inclination axes) and derivation of a direction to the receiver with the aid of the given relation of the respective inclination angle difference to the respective height offset on the receiver.

3) Attachment to a beam parameter of the laser radiation of continuously angle-dependently varying information which can be read on the part of the receiver with the aid of the incident beam and furthermore makes it possible to determine the direction to the receiver.

4) Iteratively halving windowing as a function of a hit or non-hit of the laser receiver in the respective current angle range window (for example emission of the beam only in the angle range of 0-180° if the receiver has displayed a hit: emission of the beam only in the angle range of 0-90° if the receiver has not displayed a hit for 0-180°: emission of the beam only in the angle range of 180°-270°, etc.).

The topic relating to determination of the laser receiver direction is in this case dealt with, inter alia, in the patent literature publication WO 2006/070009 A2.

In practice, however, the known methods for determining the direction have been found to be slow, not very stable, not very reliable and/or elaborate or difficult to practically implement.

Methods as described under point 1) above, which are based on the transmission from the laser receiver to the rotation laser of a signal which depends on the time of the strike on the laser receiver, and derivation of the direction information carried out directly therefrom (that is to say a real-time observation), are not very accurate (since the signal transmission time depends on the respective distance between the receiver and the rotator) and are not reliable.

The methods as described under points 2) and 4) above are relatively laborious to carry out and require various different steps and/or decisions, so that they therefore also lead to a relatively high error susceptibility. Furthermore, the method as described under point 2) functions only with a receiver held upright (oblique holding of the receiver leads to a vitiated result).

The method as described under point 3) is very elaborate to carry out, since it is necessary to attach continuously varying information to the laser radiation and, furthermore, on the receiver side special acquisition of the incident laser beam is also required (that is to say so that the attached information is not lost) and evaluation with respect to the information has to be carried out. In addition, during the evaluation of a signal generated upon detection of the laser radiation, a continuously angle-dependently varied beam parameter of the laser radiation can lead to inaccuracies in the final angle determination (for example when a global shift of the parameter in its value, which is varied angle-dependently, occurs (for instance owing to shock or ageing of the device)).

SUMMARY

It is therefore an object of the invention to provide a construction laser system, consisting of a rotation laser and a laser receiver, which is improved in respect of a functionality for determining a laser receiver direction.

In particular, the functionality for determining a laser receiver direction is intended to be more robust, faster, more reliable and/or less elaborate for implementation in practice.

The construction laser system according to the invention comprises at least a rotation laser, having a laser unit and a rotatable deflection means, for emission of a rotating laser beam, the rotating laser beam defining a reference surface, and a laser receiver which has a laser beam detector extending at least over a one-dimensional region on the laser receiver and is formed in order to generate an output signal as a function of incidence of the laser beam on the laser beam detector. An evaluation unit for determining a laser receiver direction, in which the laser receiver lies in sight of the rotation laser, is furthermore provided.

The invention in this case departs from the prior art in that a rotation angle range-dependent multitrack digital code pattern is now used for determining the laser receiver direction, the plurality of tracks being generated and formed here by a series of a plurality of rotational passes, and in each rotational pass the angle range pattern corresponding to the associated track is generated by modification of the laser beam (for example switching on and off).

On the receiver side, a signal can now be generated per strike of the laser beam and sent to the evaluation unit. There—with knowledge of the multitrack code pattern—the corresponding rotation angle range, in which the receiver must probably lie can be derived with the aid of processing of the series of incoming signals, and the desired laser receiver direction can therefore be determined.

In other words, to this end, according to the invention information about the following is stored in a memory:
   a multiplicity of defined rotation angle ranges relating to rotation of the deflection means, and
   a digital code respectively assigned uniquely to the respective rotation angle ranges, and consisting of a state value sequence which is based on a defined sequence of states relating to the laser beam, the states being taken from a set of at least two defined different discrete states relating to the laser beam.

Furthermore, a control unit is now provided for control, synchronized with the deflection means rotation, of the laser unit in relation to the generation of the at least two different discrete states, such that, in the respective rotation angle ranges, the sequence of states relating to the laser beam, which corresponds to the respective rotation angle range, is respectively generated—in the course of a series of rotational passes of the deflection means—by means of successively occurring crossings of the respective rotation angle range.

On the evaluation unit side, lastly, an output signal sequence of successively incoming output signals can be acquired, a state value sequence among the stored state value sequences, which corresponds to the output signal sequence, can be identified and the laser receiver direction can be determined as a function of that rotation angle range which is assigned to the code corresponding to the identified state value sequence.

According to the invention, therefore, both an otherwise error-prone live adaptation with various decisions during the process (see, for example, the methods as described in the introduction under points 2) and 4)) and a special configuration of the laser receiver on the device side (see, for example, the methods as described in the introduction under point 3)) can be obviated during the direction determination.

Furthermore, the process according to the invention for the direction determination can run fully automatically; it can take place in full scope always strictly according to a predetermined scheme and is therefore constant and reliable in respect of the time required as well as in respect of the result to be expected (for example as regards the accuracy of the direction determination).

Thus, in the procedure according to the invention, no interaction (merely communication) is necessary between the functional units of the system, and each of the functional units of the system can perform its activity according to an accurately predetermined scheme. In particular, each direction determination in principle then lasts an equally long time and it provides the determined direction reliably, robustly and essentially independently of external influences with a consistent and precisely systematically known maximum deviation error (even in the event of ageing of the device, etc.).

Furthermore, according to the invention it is now actually possible to obviate real-time evaluation in which the achievable result depends on how precisely individual events can be brought into temporal relation with one another (see, for example, the method as described in the introduction under point 1)). Acquisition of respective strikes on the receiver with time information storage is only necessary—depending on the embodiment of the invention—and then at most only with such a temporal accuracy/correlation, to the extent required for the assignment of the output signals of the recorded output signal sequence to the corresponding rotational passes of the series of predetermined rotational passes. Purely by way of example, with a rotation speed of 10 revolutions per second, for those embodiments of the invention which actually require time information storage to some extent, a time resolution of one tenth of a second would thus be sufficient.

Thus, the invention provides a construction laser system, consisting of a rotation laser and a laser receiver, which is improved in respect of the functionality for determining a laser receiver direction. Furthermore, the functionality for determining a laser receiver direction can therefore be implemented in an improved way even in noisy/perturbed environments, more robustly, faster, more reliably and/or less elaborately for implementation in practice.

By virtue of the lack of dependence, according to the invention, on a radio data transmission delay, the determination of the laser receiver direction can now furthermore be carried out even over large distances between the laser receiver and the rotation laser.

According to one aspect of the invention, the rotation angle ranges stored in the memory may be defined over a circumferential range of at least 180° in relation to the rotation of the deflection means. In particular, however, these may be defined over the full circumference of a rotation, that is to say over a circumferential range of 360° in relation to the rotation of the deflection means.

In this case, for example, at least 30, in particular at least 100, especially at least 500, rotation angle ranges may be defined over the circumferential range. Depending on how many rotation angle ranges are provided, taking into account the intended number of different states in relation to the laser beam, a corresponding number of code tracks or length of the state value sequence (and therefore also a corresponding number of rotational passes, and crossings of the respective rotation angle ranges taking place in this case) is also necessary.

If the producible states are in this case taken, for example, from a set of precisely two defined different discrete states in relation to the laser beam, then at least seven code tracks (that is to say a code consisting of at least seven state values) are needed for the production of 100 rotation angle ranges, since this corresponds to the smallest power of two covering the number 100 (i.e. power to base 2).

In particular, the rotation angle ranges may in this case be of equal width and equally distributed and defined directly next to one another over the circumferential range.

According to another aspect of the invention, the codes stored in the memory may be defined in such a way that neighbor pairs of state value sequences of codes, which are respectively assigned to directly neighboring rotation angle ranges, respectively differ by only one value.

This corresponds to the principle which may also be employed for rotary switches, and can have the advantage that, in the event of defective detection/taking into account of a state (that is to say a track) from the code, the direction determination takes place not entirely falsely but possibly only with an error of one directly neighboring rotation angle range.

As an alternative, however, the definition or assignment of the codes to the respective rotation angle ranges may also be carried out randomly or according to another special assignment pattern, it being essential that unique assignment (and therefore unique derivability of a corresponding rotation angle range with the aid of an identified code) is ensured (absolute coding).

As mentioned above, the required code track number—according to the intended set of discriminable states of the laser beam—depends on the desired angle resolution or on the number of rotation angle ranges to be covered/to be provided in the code. Advantageously, for example, the codes stored in the memory are defined in such a way that the state value sequences respectively comprise a state value sequence membership of at least five state values (that is to say the code has at least five tracks).

In the simplest case, the control unit may then be formed, as a function of the intended number of code tracks, for control of the laser unit such that the respective sequences of states are generated with a series of rotational passes corresponding in number to the state value sequence membership (that is to say the code track number).

In the simplest example, the code track number is in this case equal to the rotational pass number of the series of rotational passes, by means of which the code is imaged with the laser beam, so that—in other words—in this example the respective sequences of states are thus generated with a series of rotational passes which is equal in number to the state value sequence membership (that is to say the code track number).

As an alternative, however, each state of a predetermined state value sequence may, for example, be generated precisely two times in succession respectively with two rotational passes (or respectively with two successive crossings of the rotation angle range) and the evaluation of the acquired output signal sequence may finally be carried out with knowledge of this fact (for example, only every other output signal may be taken into account, or redundancy for the evaluation may thereby be established). In this example, the rotational pass number of the series of rotational passes, by means of which the respective sequence of states in relation to the laser beam is generated, would be two times as great as the state value sequence membership (that is to say the code track number).

According to another aspect of the invention, the codes and angle ranges may respectively be defined as a function of the individual case for reasons of situation or requirement, so that, for example depending on the time available for a measurement, depending on the need for precision and depending on the need for failsafety, a corresponding code pattern is employed (that is to say a number of angle ranges optimally covering the requirement, a number of code tracks (i.e. state values per code) optimally covering the requirement, and a number of rotational passes optimally covering the requirement and by means of which the code pattern is generated (so that there are optionally redundancies, the error tolerance for individual passes is increased and the failure likelihood is decreased)).

If, for example, there is little or no time limitation, a high number and resolution of angle ranges may be defined and a code with a high number of tracks may be used, in which case the code patterns are optionally generated by means of an even higher number of rotational passes with redundancies.

If, for example, a rapid (rough) measurement of the laser receiver direction is carried out, then a relatively low number and resolution of angle ranges may be defined and a code with a relatively low number of tracks may be employed, in which case the code patterns are generated by precisely one rotational pass per track.

An advantage according to the invention of the situation-relatedly freely configurable and, in particular, reconfigurable code is that, depending on the requirement, the direction measurement can be adapted in terms of speed or accuracy without hardware modifications having to be carried out. In particular, for example, five different codings may be prestored, each of which is optimized with respect to different needs, and the coding best suited to the current case may be selected by a user or an application, so that the direction measurement can be carried out in different modes (a speed mode, an accuracy mode, a compromise mode, etc.).

According to another aspect of the invention, at least two of the at least two defined different discrete states relating to the laser beam may be given by switching of the laser beam on and off. As an alternative or in addition, (optionally further) defined different discrete states may, for example, be given by different discrete intensity values of the laser beam and/or
different discrete modulation frequencies of the laser beam.

What is essential for the invention, and furthermore an advantage of the invention, is that the states are discrete and differ clearly and discontinuously from one another, so that acquisition which is sensitive in relation to a continuous variation of a laser beam parameter—which would otherwise be error-prone—is not necessary.

In particular, different states in relation to the laser beam are selected which are distance-dependent and simply and clearly distinguishable from one another in acquisition and evaluation.

For this reason, the code used according to the invention is to be referred to as a digital code, that is to say continuous variation of a beam parameter is not used, but instead discrete states discontinuously differing and clearly separate from one another in relation to the laser beam are used.

For example, two laser beams of different wavelength may be used (either with the aid of two laser sources switched on and off alternately or in superposition, which emit in clearly distinguishable colors, or with the aid of a tunable laser diode which emits alternately with different wavelengths). As an alternative or in addition, the laser beam may be emitted with two discrete modulation frequencies clearly distinguishable from one another, etc.

The advantage of using discrete and discontinuous states which can be distinguished clearly is the lack of dependency on the distance from the laser receiver to the rotation laser, and that even in the event of ageing or an absolute shift due to another reason of the laser beam parameter(s) varied in order to generate the discrete states, they can as before be identified uniquely distinguishably from one another (for example with the aid of knowledge that a certain state is provided by one laser beam parameter with a clearly higher value compared with a certain other state, so that by comparison of the signals with one another on the acquisition side/evaluation side—despite an absolute value shift relating to this parameter—the states can as before be provided and distinguished from one another on the acquisition side/evaluation side and uniquely identified, so that the quality of the result of the direction determination ultimately remains uninfluenced as before).

According to another aspect of the invention, the evaluation unit and/or the laser receiver are formed in order to evaluate the output signals—acquired in the scope of the output signal sequence—in relation to the at least two defined different discrete states and in order to attach corresponding information to the output signals (in particular when the output signal itself does not anyway inherently make the respective state derivable, or itself inherently make information about this obtainable). The evaluation unit may then be formed in order to identify the corresponding state value sequence by using the information attached to the respective output signals. If information about the at least two defined different discrete states is attached to the respective output signals directly by virtue of their generation (that is to say during generation by the laser receiver by means of its laser beam detector), then the evaluation unit may identify the corresponding state value sequence directly by using the information directly attached to the respective output signals.

In one embodiment of the invention, in which at least two of the at least two defined different discrete states relating to the laser beam are given by switching of the laser beam on and off, the laser receiver may be formed in order to generate the output signals with information attached relating to an incidence time of the laser beam on the laser beam detector (for example, signals which respectively embody a time-stamped strike may be generated; alternatively, for example, periods of time respectively elapsing between successive strikes may also be embodied as signals). As an alternative or in addition, the evaluation unit may also attach information relating to a reception time to the respective transmitted output signals, so that information about the rotational passes of the series of rotational passes, in the rotation angle range where the laser receiver lies, in which the laser beam was respectively switched on or off, may be obtained therefrom.

In other words, these measures mentioned by way of example ensure that the respective output signals of the output signal sequence respectively have time information attached which depends on the incidence of the laser beam on the laser beam detector. The evaluation unit can thereby identify the state value sequence corresponding to the acquired output signal sequence by using the time information attached to the output signals.

According to another aspect of the invention, in order to acquire the output signal sequence, in order to identify the state value sequence and in order to determine the laser receiver direction, the evaluation unit uses the knowledge about the stored defined rotation angle ranges and the stored codes assigned thereto and respectively consisting of a state value sequence (i.e. the evaluation unit resorts to the stored information).

That is to say, the acquisition of the output signal sequence, the identification of the state value sequence and the determination of the laser receiver direction are based on information stored in the memory (such as the defined rotation angle ranges and the codes assigned thereto).

In particular, the acquisition of the output signal sequence, the identification of the state value sequence and the determination of the laser receiver direction may furthermore be based on a trigger signal (for example for starting the reception of the output signal sequence),
the number of rotational passes of the series of rotational passes (for example for setting an end of the output signal sequence) and/or
knowledge about a defined constant rotation speed of the deflection means (for example for assigning subsequent members of the output signal sequence, with time information attached, to respective rotational passes of the series).

As an alternative, however, the code itself may also be defined and selected in such a way that, with the aid of the state value sequence itself, it can be established that the code now begins or has begun (for example by each code having a uniformly specially established state in the first track). Likewise, an end of the code, for example specified in another way, may be establishable with the aid of the known code track number or in turn with the aid of the fact that each code has a uniformly specially established state in the last track.

Assignment of output signals of the output signal sequence to respective rotational passes of the series (or to respective state values of the state value sequence of the code) may also be carried out with the aid of a subsequent member sequence or subsequent member number/position.

According to another aspect of the invention, a specific direction, in particular the direction corresponding to the respective rotation angle range bisectors, may respectively be stored in the memory for the respective rotation angle ranges. The evaluation unit may then retrieve the corresponding direction (that is to say the direction which is stored for the rotation angle range that corresponds to the identified code), and set or determine or output this retrieved direction as the laser receiver direction.

As an alternative, however, another specific direction from the rotation angle range may also be stored (for example the direction corresponding to the left or right rotation angle range limit, etc.), which is then determined and output as the laser receiver direction.

For the control according to the invention, synchronized with the deflection means rotation, in particular means may be provided in the rotation laser for making available continuous angle information relating to a respective current rotational position of the deflection means.

These means may, for example,
- be formed as an angle encoder for continuous measurement of the respective current rotational position of the deflection means, and/or
- have a defined zero angle mark for a rotation of the deflection means and a zero angle mark sensor, so that a respective current rotational position of the deflection means can be derived continuously by means of an output of the zero angle mark sensor together with knowledge about a defined constant rotation speed of the deflection means.

Accordingly, the control by the control unit, synchronized with the deflection means rotation, may be based on
- the stored defined rotation angle ranges and the stored codes assigned thereto and respectively consisting of a state value sequence,
- the continuous angle information made available relating to the respective current rotational position of the deflection means, or the knowledge continuously currently derivable therefrom regarding that of the defined rotation angle ranges in which the deflection means lies with regard to its respective current rotational position, and
- counting the individual rotational passes in the course of a series of rotational passes of the deflection means, of which counting the control unit is capable, and derivable knowledge associated therewith regarding that rotational pass of the series of rotational passes in which the deflection means respectively currently lies.

According to another aspect of the invention, the rotation laser
- may be formed as a self-leveling rotation laser and, in particular, a dual-grade rotation laser, and/or
- may be equipped with a grade catch functionality, a grade lock functionality, in particular with tracking functionality, an axis alignment functionality, and/or a field calibration functionality for the self leveling (as such a functionality is described, for example, in the European Patent Application of the Applicant Leica Geosystems AG, CH-Heerbrugg, represented by Kaminski Harmann, Patent Attorneys AG (Amalgamation 204) filed under the attorney reference KAP-52920-EP on 19 Mar. 2013), and be formed in order to use the determinable laser receiver direction in the scope of at least one of the functionalities indicated.

The place, or position, where the evaluation unit is physically fitted, or provided, in the scope of the system according to the invention may in this case be selected differently according to need/requirements and according to the desired design, for example in the rotation laser, in the receiver or in a third physical component (for example in a processing and control unit on a machine) or even distributed over a plurality of physical units, for example distributed in parts between the receiver and the rotation laser, a first part of the evaluation (for instance preprocessing) being carried out in the receiver and the further processing, and final direction determination from the preprocessed data, being carried out in the rotation laser.

Depending on the position where the evaluation unit is fitted, various types of communication means with corresponding communication interfaces may furthermore be provided, which are used to transmit the output signal to the evaluation unit or—if the evaluation units is formed and fitted physically distributed between a plurality of units—for transmitting data between the parts of the evaluation unit. For example, radio links or other wireless or wired data links may be used for this, as are well known from the prior art.

The invention furthermore relates to a rotation laser for use as a part in the described construction laser system. The rotation laser is in this case correspondingly equipped with at least one laser unit and a continuously rotatable deflection means, for emission of a rotating laser beam such that the rotating laser beam defines a reference surface.

According to the invention, the rotation laser in this case has a memory, in which the following are stored:
- a multiplicity of defined rotation angle ranges relating to rotation of the deflection means, and
- a digital code respectively assigned uniquely to the respective rotation angle ranges, and consisting of a state value sequence which is based on a defined sequence of states relating to the laser beam, the states being taken from a set of at least two defined different discrete states relating to the laser beam.

Furthermore, according to the invention the rotation laser has a control unit for control, synchronized with the deflection means rotation, of the laser unit in relation to the generation of the at least two different discrete states, such that, in the respective rotation angle ranges, the sequence of states relating to the laser beam, which corresponds to the respective rotation angle range, is respectively generated—in the course of a series of rotational passes of the deflection means—by means of successively occurring crossings of the respective rotation angle range.

In one refinement, in which a laser receiver direction (in which a laser receiver, which the rotating laser beam strikes, lies in sight of the rotation laser) can be determined in the rotation laser, the rotation laser is furthermore equipped with a communication interface for receiving an output signal which is dependent on the laser beam incidence and was generated by a laser receiver which the rotating laser beam strikes, and an evaluation unit for determining the laser receiver direction, the evaluation unit being formed, specifically,
- in order to acquire an output signal sequence of successively arriving output signals,
- in order to identify a state value sequence among the stored state value sequences, which corresponds to the output signal sequence, and in order to determine the laser receiver direction as a function of that rotation angle range which is assigned to the code corresponding to the identified state value sequence.

The special aspects, embodiments and refinements mentioned in the scope of the construction laser system described above may optionally also be applied in a similar way likewise to the rotation laser.

The invention furthermore relates to a laser receiver for use as a part in the construction laser system described above.

The laser receiver is in this case correspondingly equipped with at least
- a laser beam detector extending at least over a one-dimensional region on the laser receiver, so that an output signal as a function of incidence of the laser beam on the laser beam detector, and
- an evaluation unit for determining a laser receiver direction, in which the laser receiver lies in sight of a rotation laser—interacting with the laser receiver in the construction laser system.

According to the invention, the laser receiver in this case has a memory in which the following are stored:
- a multiplicity of defined rotation angle ranges relating to rotation of a deflection means of the rotation laser—interacting with the laser receiver in the construction laser system, and
- a digital code respectively assigned uniquely to the respective rotation angle ranges, and consisting of a state value sequence which is based on a defined sequence of states relating to a laser beam which can be emitted by the rotation laser interacting with the laser receiver in the construction laser system, the states being taken from a set of at least two defined different discrete states relating to the laser beam.

Furthermore, according to the invention, the evaluation unit of the laser receiver is now formed
- in order to generate an output signal sequence of successively generated output signals,
- in order to identify a state value sequence among the stored state value sequences, which corresponds to the output signal sequence, and
- in order to determine the laser receiver direction as a function of that rotation angle range which is assigned to the code corresponding to the identified state value sequence.

The special aspects, embodiments and refinements mentioned in the scope of the construction laser system described above may optionally also be applied in a similar way likewise to the laser receiver.

Furthermore, the invention also relates to a method for laser receiver detection determination with
- a rotation laser, having a laser unit and a continuously rotatable deflection means, for emission of a rotating laser beam such that the rotating laser beam defines a reference surface, and
- a laser receiver having a laser beam detector extending at least over a one-dimensional region on the laser receiver, so that the laser receiver is formed in order to generate an output signal as a function of incidence of the laser beam on the laser beam detector.

According to the invention, the following are defined for the method:
- a multiplicity of rotation angle ranges relating to rotation of the deflection means and
- a digital code respectively assigned uniquely to the respective rotation angle ranges, and consisting of a state value sequence which is based on a defined sequence of states relating to the laser beam, the states being taken from a set of at least two defined different discrete states relating to the laser beam.

Furthermore, according to the invention, the following are carried out in the scope of the method:
- control, synchronized with the deflection means rotation, of the emission of the laser beam in relation to the at least two different discrete states, such that, in the respective rotation angle ranges, the sequence of states relating to the laser beam, which corresponds to the respective rotation angle range, is respectively generated—in the course of a series of rotational passes of the deflection means—by means of successively occurring crossings of the respective rotation angle range,
- acquisition of an output signal sequence of successively arriving output signals,
- identification of a state value sequence among the stored state value sequences, which corresponds to the output signal sequence, and
- determination of a laser receiver direction in which the laser receiver lies in sight of the rotation laser, as a function of that rotation angle range which is assigned to the code corresponding to the identified state value sequence.

The special aspects, embodiments and refinements mentioned in the scope of the construction laser system described above may also be applied in a similar way likewise to this method.

Furthermore, the invention also relates to a computer program product having program code which is stored on a machine-readable medium and contains information stored according to the invention about
- a multiplicity of defined rotation angle ranges relating to rotation of a deflection means, and
- a digital code respectively assigned uniquely to the respective rotation angle ranges, and consisting of a state value sequence which is based on a defined sequence of states relating to a laser beam, the states being taken from a set of at least two defined different discrete states relating to the laser beam.

The computer program product contains a program code such that it is formed for carrying out the method described above, in particular when the program is run on an electronic data processing unit, the electronic data processing unit being used in particular as a control and evaluation unit of the construction laser system described above, as a control and optionally evaluation unit of the rotation laser described above, or as an evaluation unit of the laser receiver described above.

The special aspects, embodiments and refinements mentioned in the scope of the construction laser system described above may also be applied in a similar way likewise to this computer program product.

BRIEF DESCRIPTION OF THE DRAWINGS

The method according to the invention and the device according to the invention will be described in more detail below, purely by way of example, with the aid of specific exemplary embodiments schematically represented in the drawings, further advantages of the invention also being discussed. In detail.

DETAILED DESCRIPTION

Figure 1:
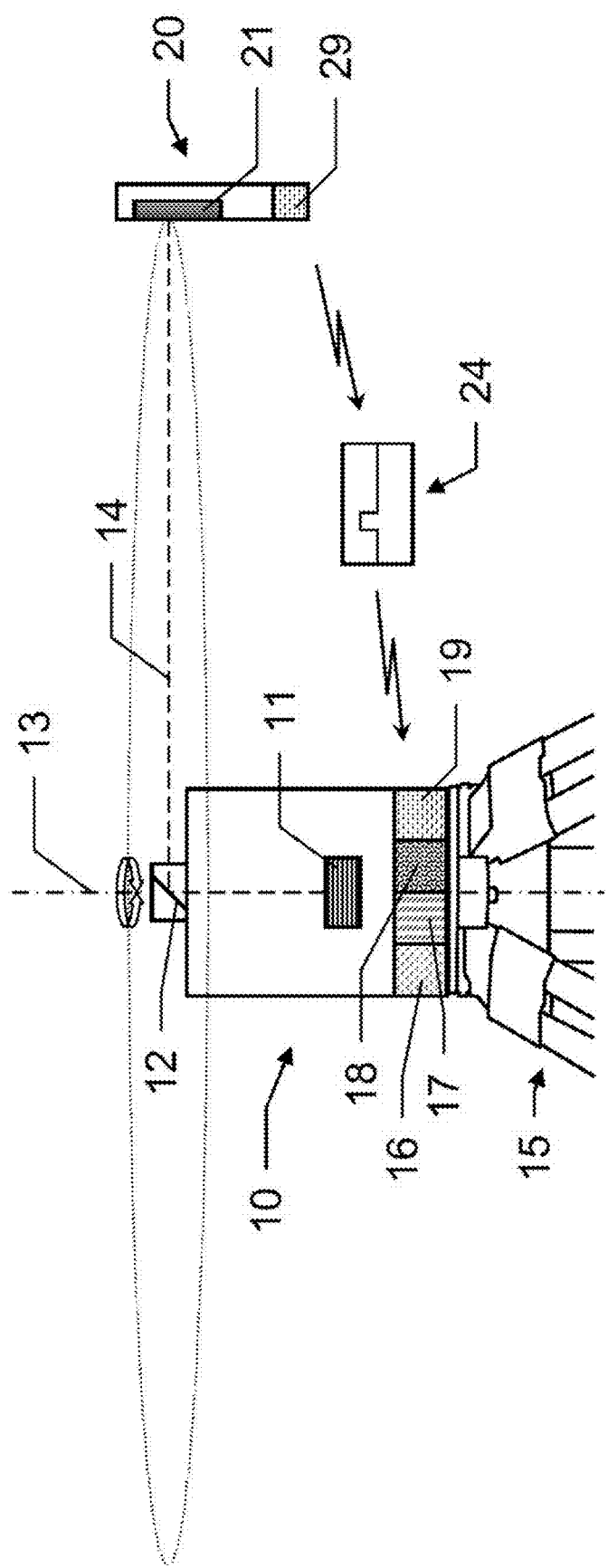
FIG. 1 shows a schematic exemplary embodiment of a construction laser system according to the invention.

FIG. 1 shows an exemplary embodiment of a construction laser system according to the invention, comprising a rotation laser 10 having a laser unit 11 and a rotatable deflection means 12, for emission of a rotating laser beam 14, the rotating laser beam defining a reference surface, and a laser receiver 20 having a laser beam detector 21, which extends at least over a one-dimensional region on the laser receiver and is formed in order to generate an output signal 24 as a function of incidence of the laser beam on the laser beam detector. Also provided is an evaluation unit 16 for determining a laser receiver direction in which the laser receiver 20 lies in sight of the rotation laser 10.

Figure 2:
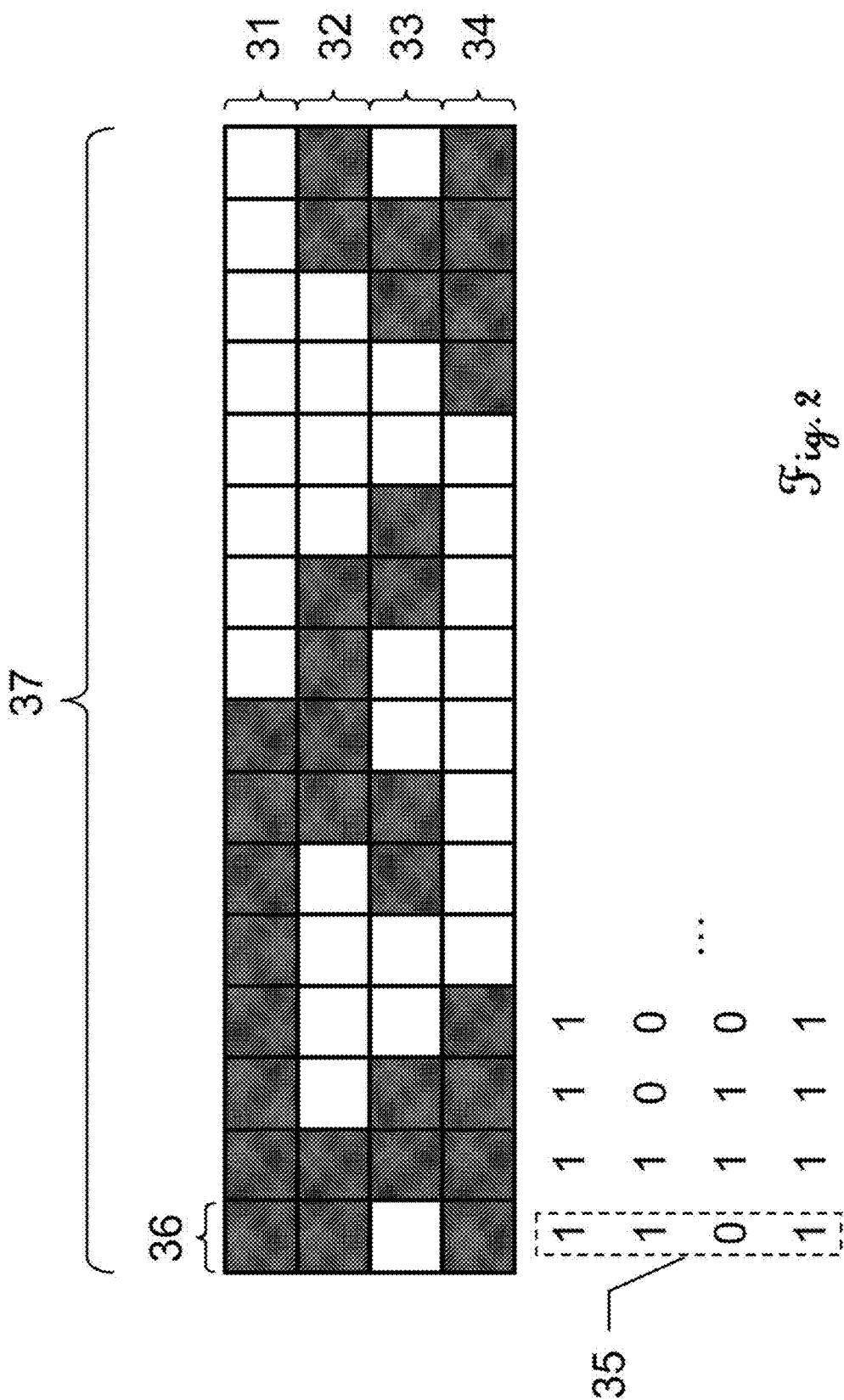
FIG. 2 shows an illustration to explain the coding according to the invention.

According to the invention—as is illustrated in more detail in FIG. 2—a rotation angle range-dependent multitrack digital code pattern is then used in order to determine the laser receiver direction.

To this end, according to the invention, information about the following is stored in a memory 17:
 a multiplicity of defined rotation angle ranges relating to rotation of the deflection means 12, and
 a digital code respectively assigned uniquely to the respective rotation angle ranges, and consisting of a state value sequence which is based on a defined sequence of states relating to the laser beam 14, the states being taken from a set of at least two defined different discrete states relating to the laser beam 14.

Furthermore, a control unit 18 is now provided for control, synchronized with the deflection means rotation, of the laser unit 11 in relation to the generation of the at least two different discrete states, such that, in the respective rotation angle ranges, the sequence of states relating to the laser beam 14, which corresponds to the respective rotation angle range, is respectively generated—in the course of a series of rotational passes of the deflection means 12—by means of successively occurring crossings of the respective rotation angle range.

On the evaluation unit side, lastly, it is possible to acquire an output signal sequence of successively arriving output signals 24, identify a state value sequence among the stored state value sequences, which corresponds to the output signal sequence, and determine the laser receiver direction as a function of that rotation angle range which is assigned to the code corresponding to the identified state value sequence.

In this embodiment relating to the spatial fitting of the evaluation unit 16, the memory 17 and the control unit 18, wireless communication means may be provided which have a communication interface 19 at least receiving data on the rotation laser side and a communication interface 29 at least transmitting data on the laser receiver side (in particular respectively radio modules), which are used to transmit the output signal 24 to the evaluation unit 19.

In particular, this makes the laser receiver direction determination possible in a straightforward way, without predefined hardware adaptation, making modularity impossible, of various components of the two interacting devices to one another being necessary for this (for example in terms of the wavelength or the modulation method of the laser beam with corresponding hardware configuration of the laser source on the transmitter side, or of the laser beam detector on the receiver side) and without any dedicated special configuration of the laser receiver being unavoidably necessary for this (and the functionality can therefore be independent of the laser receiver device configuration). Furthermore, laser receiver direction determination can also be carried out in parallel for two or more laser receivers.

For the rotation laser 10, here set up on a stand 15, in detail different embodiments of laser sources for the laser unit 11, in particular diode lasers, are known from the prior art. Along its beam path, the laser radiation emitted by the laser unit 11 strikes a laser radiation deflection unit 12 which deflects the laser beam, by 90° in the example shown. The laser radiation deflection unit 12 is formed for example as a mirror tilted by 45° with respect to the incident laser radiation, but preferably as a pentaprism or pentamirror, which always deflects the laser radiation by 90° irrespective of the angle of incidence. The laser radiation deflection unit 12 is actively connected to a rotation-inducing unit, in such a way that the laser radiation deflection unit 12 can be motor-drivably rotated about a rotation axis 13. The rotation unit is formed, for example, as a ball-mounted sleeve which encloses the beam path of the laser radiation and is driven via a belt drive by an electric motor. The emission of laser radiation 14 therefore takes place in a rotating emission direction α, so that the quasi-laser plane represented is generated. The point of intersection of this quasi-laser plane with the rotation axis 13 is defined as the rotation center. The rotation center may be enclosed by a transparent exit window, in such a way that the laser radiation passes out through the exit window. Means, for example in the form of an angle detector, which make it possible to acquire the respective current angle orientation of the laser radiation deflection unit 12 (that is to say angle information relating to a respective current rotational position of the deflection means 21), and therefore the current emission direction α of the laser radiation 5, may be arranged indirectly on the rotation unit 3.

The laser beam detector 21 of the laser receiver 20 may furthermore—as is known from the prior art—be formed in such a way that an incidence position of the laser beam on the laser beam detector line or surface can additionally be derived, to which end the photosensitive elements—considered in an upright operating position of the device—may be sequenced with one another in a vertically oriented sensor row, so that the laser beam detector 21 thus extends at least over a vertical line (as a one-dimensional region) on the laser receiver 20. Furthermore, in the laser receiver 20, a separate evaluation unit, for instance for determining the position of the laser receiver relative to the reference height defined by the rotating laser beam with the aid of the output of the laser beam detector 20, as well as an indicator for the position determined (for instance a visual display), in particular formed in order to indicate whether the laser receiver 20 coincides exactly with the reference surface, may also be integrated into the laser receiver device. The position may, for example, in this case be determined e.g. as the midpoint of that region on the laser beam detector row which is illuminated by the laser beam.

FIG. 2 shows an illustration to explain the rotation angle range-dependent absolute multitrack digital coding according to the invention.

The plurality of tracks are in this case generated and imaged by a series of a plurality of rotational passes 31-34, and, in the respective rotational pass, the angle range pattern corresponding to the associated track is in this case generated by modification of the laser beam (for example switching on and off).

To this end, a digital code 35 consisting of a four-membered state value sequence (which corresponds to four code tracks), which is based on a defined sequence of states relating to the laser beam, is respectively assigned uniquely to the respective rotation angle ranges 36, the states in this case being taken from a set of, in this case, two defined different discrete states relating to the laser beam (e.g. a laser beam switched on [represented as white, or unfilled, in the pattern] and a laser beam switched off [represented by dark shading]).

The rotation angle ranges 36 are defined here by the circumferential region 38, represented as figuratively rolled out, or planar, relating to a rotation of the deflection means.

With the set of two states and four tracks as used here, 16 unique codes can be generated (two to the power of 4). One of the 16 codes is assigned uniquely to each of the 16 defined angle ranges.

Furthermore, in the example shown, the codes are defined in such a way that neighbor pairs of state value sequences of the codes, which are respectively assigned to directly neighboring rotation angle ranges, respectively differ by only one member (that is to say respectively by only one state value).

Furthermore, in this case, the rotation angle ranges are defined as being each of equal width and equally distributed and directly adjacent to one another over the circumferential range 38.

On the receiver side, a signal can now be generated per incidence of the laser beam (i.e. per strike) and sent to the evaluation unit. There—with knowledge of the multitrack code pattern—the corresponding rotation angle range, in which the receiver must probably lie, can be derived with the aid of processing of the series of incoming signals, and the desired laser receiver direction can therefore be determined.

Figure 3:
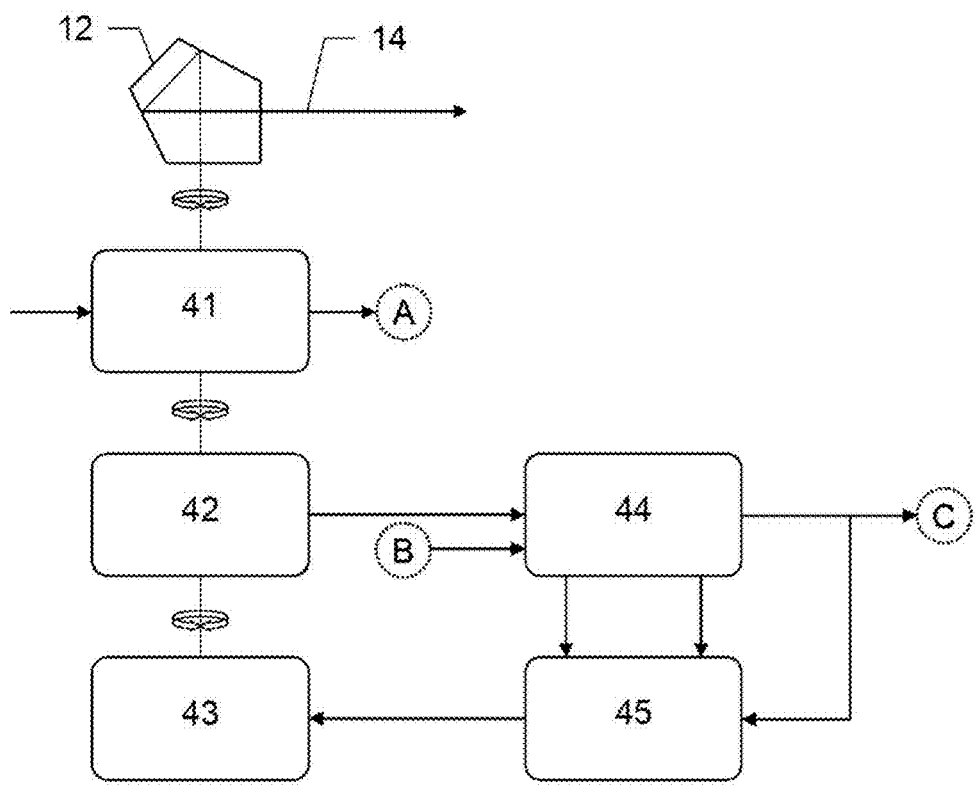
FIG. 3 shows an illustration to explain an example of the structure of the control for the laser unit (that is to say an illustration for exemplary explanation of the laser pattern encoder principle)

FIG. 3 shows an illustration to explain an example of the structure of the control for the laser unit (that is to say an illustration for exemplary explanation of the laser pattern encoder principle).

The rotating pentaprism as deflection means 12, driven with a known rotational speed A by the electric motor 41, is mechanically coupled to a rotary transducer 42 (in particular a rotary angle transducer). The laser beam 14 emitted by the laser unit and emerging through the pentaprism can be controlled by a laser driver 43 (which is part of the control unit). The rotary transducer 42 provides information about the current rotational angle position of the pentaprism.

A state machine 44, as part of the control unit, comprises a rotational pass counter and an input for an external trigger signal B (for starting the generation of the sequence of states by means of—in the course of the series of rotational passes—successively occurring crossings of the respective rotation angle ranges) in order to generate the following signals:
signal C for starting the code pattern emission,
signal for the current angle range, in which the pentaprism lies, and
signal for the current rotational pass.

The codes are in this case stored in the look-up table 45. This look-up table 45 then generates an ON/OFF signal for the laser driver 43 as a function of the aforementioned signals from the state machine 44. The ON/OFF state relating to the laser beam may in this case be defined individually for the respective angle ranges and the respective rotational passes after application of the trigger signal B.

Figure 4:
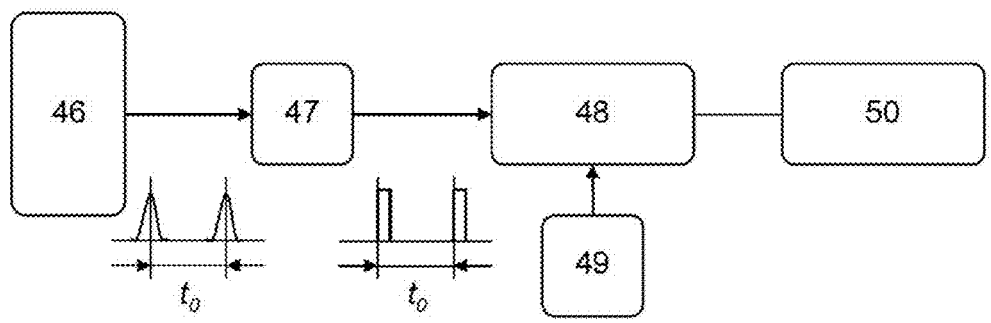
FIG. 4 shows an illustration of the function which the laser receiver can assume by way of example in the scope of the construction laser system.

FIG. 4 shows an illustration of the function which the laser receiver can assume in the scope of the construction laser system, purely by way of example.

The laser receiver is in this case formed in order to measure the time t0 between two successive strikes by the laser beam on the laser beam detector 46, to which end the raw output signal of the laser beam detector 46 is fed through by a trigger 47 and a counter circuit 48. The time t0 is transmitted via a radio module 50, internal to the receiver, to the rotation laser as a multiple of a basic time unit (for example 1 ms).

Figure 5:
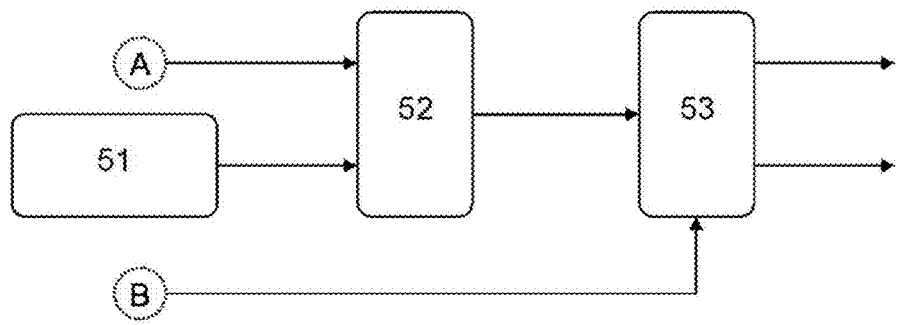
FIG. 5 shows an illustration to explain an example of the structure of the evaluation unit (that is to say an illustration for exemplary explanation of the laser pattern decoder principle).

FIG. 5 shows an illustration to explain an example of the structure of the evaluation unit (that is to say an illustration for exemplary explanation of the laser pattern decoder principle).

The radio module 51 of the rotation laser receives and records the sequence of strike time intervals from the laser receiver. The symbol generator 52 calculates back to the respective states with the aid of the acquired sequence of strike time intervals and with the aid of the known rotational speed A. A symbol is in this case a discrete value as a multiple of a rotation pass, as follows:
symbol A: there is one rotational pass between two strikes
Symbol B: there are two rotational passes between two strikes
symbol C: there are three rotational passes between two strikes
etc.

The sequence of symbols compiled in this way for a rotation angle range is independent of the rotation period of the deflection means. The decoder 53 converts the sequence of symbols into a valid corresponding code number (which is assigned to the angle range in which the laser receiver accordingly lies).

According to the invention, real-time communication between the laser receiver and the rotation laser is therefore not absolutely necessary.

In the invention, conversely, the transmission time for the radio communication may be unknown, since the laser pattern encoding can be carried out independently and, if need be asynchronously, with respect to the decoding of the desired direction.

Furthermore, no prior knowledge about the codes used is necessary on the part of the laser receiver.

It is to be understood that these represented figures only represent possible exemplary embodiments schematically. The various approaches may likewise be combined with one another as well as with methods of the prior art.

What is claimed is:

1. A construction laser system comprising:
a rotation laser having a laser unit and a continuously rotatable deflection means for emission of a rotating laser beam that defines a reference surface;
a laser receiver having a laser beam detector extending at least over a one-dimensional region on the laser receiver, so that the laser receiver generates an output signal as a function of incidence of the laser beam on the laser beam detector;
an evaluation unit for determining a laser receiver direction, in which the laser receiver lies in sight of the rotation laser;
a memory that stores:
a plurality of defined rotation angle ranges relating to rotation of the deflection means; and
a digital code respectively assigned uniquely to the respective rotation angle ranges, the digital code including a state value sequence based on a defined sequence of states relating to the laser beam, the states being taken from a set of at least two defined different discrete states relating to the laser beam; and a control unit for control, synchronized with rotation of the deflection means, of the laser unit in relation to the generation of the at least two different discrete states, such that, in the respective rotation angle ranges, the sequence of states relating to the laser beam, which corresponds to the respective rotation angle range, is respectively generated in the course of a series of rotational passes of the deflection means by successively occurring crossings of the respective rotation angle range, wherein the evaluation unit:
  generates an output signal sequence of successively generated output signals;
  identifies a state value sequence among the stored state value sequences, which corresponds to the output signal sequence; and
  determines the laser receiver direction as a function of that rotation angle range which is assigned to the code corresponding to the identified state value sequence.

2. The construction laser system according to claim 1, wherein:
  the rotation angle ranges stored in the memory are defined over a circumferential range of at least 180° in relation to rotation of the deflection means;
  there are at least 30 rotation angle ranges respectively of substantially equal width being defined over the circumferential range.

3. The construction laser system according to claim 2, wherein:
  the circumferential range is 360°.

4. The construction laser system according to claim 2, wherein:
  there are at least 100 rotation angle ranges respectively of substantially equal width being defined over the circumferential range.

5. The construction laser system according to claim 4, wherein:
  there are at least 500 rotation angle ranges respectively of substantially equal width being defined over the circumferential range.

6. The construction laser system according to claim 1, wherein:
  the codes stored in the memory are defined such that neighbor pairs of state value sequences of codes, which are respectively assigned to directly neighboring rotation angle ranges, respectively differ by only one value.

7. The construction laser system according to claim 1, wherein:
  the codes stored in the memory are defined such that the state value sequences respectively include a state value sequence membership of at least five state values, with the control unit being formed for control of the laser unit such that the respective sequences of states are generated with a series of rotational passes corresponding in number to the state value sequence membership.

8. The construction laser system according to claim 1, wherein:
  the states are taken from a set of exactly two defined different discrete states relating to the laser beam.

9. The construction laser system according to claim 1, wherein:
  the at least two defined different discrete states relating to the laser beam include defined different discrete states that are given by switching of the laser beam on and off; and/or
  the at least two defined different discrete states differ by: different discrete intensity values of the laser beam; and/or
  different discrete modulation frequencies of the laser beam.

10. The construction laser system according to claim 1, wherein the evaluation unit and/or the laser receiver:
  evaluate the output signals, acquired in the scope of the output signal sequence, in relation to the at least two defined different discrete states;
  attach corresponding information to the output signals; and
  identifies the corresponding state value sequence by using the information attached to the respective output signals.

11. The construction laser system according to claim 1, wherein:
  the at least two defined different discrete states relating to the laser beam include defined different discrete states that are given by switching of the laser beam on and off; and
  the laser receiver generates the output signal with information attached relating to an incidence time of the laser beam on the laser beam detector.

12. The construction laser system according to claim 1, wherein:
  the at least two defined different discrete states relating to the laser beam include defined different discrete states that are given by switching of the laser beam on and off; and
  the evaluation unit attaches information relating to a reception time to the respective transmitted output signals, so that the respective output signals of the output signal sequence respectively have time information attached as a function of the incidence of the laser beam on the laser beam detector, the evaluation unit can thereby identifying the state value sequence corresponding to the acquired output signal sequence by using the time information attached to the output signals of the acquired output signal sequence.

13. The construction laser system according to claim 1, wherein:
  the evaluation unit acquires the output signal sequence, to identify the state value sequence and to determine the laser receiver direction on the basis of:
  the stored defined rotation angle ranges and the stored codes that are assigned thereto and respectively include a state value sequence;
  the trigger signal;
  the number of rotational passes of the series of rotational passes; and/or
  information about a defined constant rotation speed of the deflection means.

14. The construction laser system according to claim 1, wherein:
  the direction corresponding to the respective rotation angle range bisectors is respectively stored in the memory for the respective rotation angle ranges; and
  the evaluation unit retrieves the direction stored for that rotation angle range which is assigned to the code corresponding to the identified state value sequence, and the retrieved direction can be determined and output as the laser receiver direction.

15. The construction laser system according to claim 1, wherein:
  the rotation laser is adapted to make available continuous angle information relating to a respective current rotational position of the deflection means, using at least one of:

an angle encoder for continuous measurement of the respective current rotational position of the deflection means; and a defined zero angle mark for a rotation of the deflection means and a zero angle mark sensor, so that a respective current rotational position of the deflection means can be derived continuously using an output of the zero angle mark sensor together with information about a defined constant rotation speed of the deflection means; and control by the control unit, synchronized with the rotation of the deflection means rotation, uses at least one of:

the stored defined rotation angle ranges and the stored codes assigned thereto and respectively consisting of a state value sequence;

the continuous angle information made available relating to the respective current rotational position of the deflection means, or information continuously currently derivable therefrom regarding that of the defined rotation angle ranges in which the deflection means lies with regard to its respective current rotational position; and counting the individual rotational passes in the course of the series of rotational passes of the deflection means, of which counting the control unit is capable, and derivable information associated therewith regarding that rotational pass of the series of rotational passes in which the deflection means respectively currently lies.

16. The construction laser system according to claim 1, wherein the rotation laser:
   is as a self-leveling, dual-grade rotation laser; and/or
   is equipped with at least one of the following further functionalities and uses the determinable laser receiver direction in the scope of at least one of said further functionalities:
      grade catch;
      grade lock, in particular with tracking;
      axis alignment; and
      field calibration functionality for the self-leveling.

17. A rotation laser for use in the construction laser system according to claim 1, the rotation laser comprising:
   a laser unit and a continuously rotatable deflection means for emission of a rotating laser beam that defines a reference surface; and
   a communication interface for receiving an output signal generated by a laser receiver which the rotating laser beam strikes, dependent on an incidence of the laser beam.

18. A laser receiver for use in the construction laser system according to claim 1, the laser receiver comprising:
   a laser beam detector extending at least over a one-dimensional region on the laser receiver, so that the laser receiver generates an output signal as a function of incidence of the laser beam on the laser beam detector.

19. A method for laser receiver direction determination, the method being adapted for use with a laser system that includes:
   a rotation laser, having a laser unit and a continuously rotatable deflection means, for emission of a rotating laser beam such that the rotating laser beam defines a reference surface;
   a laser receiver having a laser beam detector extending at least over a one-dimensional region on the laser receiver, so that the laser receiver is formed in order to generate an output signal as a function of incidence of the laser beam on the laser beam detector; and
   a memory that stores:
      a plurality of defined rotation angle ranges relating to rotation of the deflection means; and
      a digital code respectively assigned uniquely to the respective rotation angle ranges, the digital code including a state value sequence based on a defined sequence of states relating to the laser beam, the states being taken from a set of at least two defined different discrete states relating to the laser beam,
   wherein the method comprises:
   controlling, synchronously with the deflection means rotation, the emission of the laser beam in relation to the at least two different discrete states, such that, in the respective rotation angle ranges, the sequence of states relating to the laser beam, which corresponds to the respective rotation angle range, is respectively generated in the course of a series of rotational passes of the deflection means, by successively occurring crossings of the respective rotation angle range;
   acquiring an output signal sequence of successively arriving output signals;
   identifying a state value sequence among the stored state value sequences, which corresponds to the output signal sequence; and
   determining a laser receiver direction in which the laser receiver lies in sight of the rotation laser, as a function of that rotation angle range which is assigned to the code corresponding to the identified state value sequence.

20. A computer program product having program code which is stored on a non-transitory machine-readable medium and comprises:
   stored information about a plurality of defined rotation angle ranges relating to rotation of a deflection means; and
   a digital code respectively assigned uniquely to the respective rotation angle ranges, and including a state value sequence based on a defined sequence of states relating to a laser beam, the states being taken from a set of at least two defined different discrete states relating to the laser beam, the digital code being adapted for performing the method according to claim 19, when the program is run on an electronic data processing unit.

* * * * *